(12) United States Patent
Tonelli

(10) Patent No.: US 8,739,731 B2
(45) Date of Patent: Jun. 3, 2014

(54) DELIVERY ASSEMBLY

(75) Inventor: Massimo Tonelli, Casalecchio di Reno (IT)

(73) Assignee: G.T. Line S.r.l., Crespellano (IT)

(*) Notice: Subject to any disclaimer, the term of this patent is extended or adjusted under 35 U.S.C. 154(b) by 210 days.

(21) Appl. No.: 12/998,274

(22) PCT Filed: Oct. 7, 2008

(86) PCT No.: PCT/IT2008/000635
§ 371 (c)(1),
(2), (4) Date: Apr. 4, 2011

(87) PCT Pub. No.: WO2010/041282
PCT Pub. Date: Apr. 15, 2010

(65) Prior Publication Data
US 2011/0180532 A1      Jul. 28, 2011

(51) Int. Cl.
*B05C 11/10*          (2006.01)
*B05B 3/00*           (2006.01)
(52) U.S. Cl.
USPC ............ 118/697; 118/323; 118/679; 118/681
(58) Field of Classification Search
CPC .................................. B05C 11/10; B05B 3/00
USPC ......... 118/300, 302, 321, 323, 679–681, 696, 118/697; 427/373; 425/113
See application file for complete search history.

(56) References Cited

U.S. PATENT DOCUMENTS

| 4,209,557 | A | * | 6/1980 | Edwards | ........................ 427/373 |
| 4,295,573 | A | * | 10/1981 | Terry et al. | .................... 215/348 |
| 4,390,337 | A | | 6/1983 | Gately | |
| 4,426,023 | A | | 1/1984 | Sperry | |
| 5,556,471 | A | * | 9/1996 | Boccagno et al. | ............ 118/300 |
| 6,056,527 | A | * | 5/2000 | Bunyan et al. | ................. 425/113 |

FOREIGN PATENT DOCUMENTS

DE      32 38 812 A1     4/1984
EP      0 250 389 A1    12/1987

OTHER PUBLICATIONS

Computer English Translation DE 3238812 A1 , Apr. 26, 1984.*

* cited by examiner

*Primary Examiner* — Yewebdar Tadesse
(74) *Attorney, Agent, or Firm* — Modiano & Associati; Albert Josif; Daniel J. O'Byrne

(57) ABSTRACT

A delivery assembly for depositing a gasket made of polymeric material within a seat having a predefined shape provided within a product, which comprises at least one working head provided with a nozzle for dispensing the polymeric material substantially in the liquid state. An increase in volume is associated with the polymeric material at the phase transition from liquid to solid; the expanded gasket, due to the increase in volume, defines by interference a stable coupling with the seat.

9 Claims, 4 Drawing Sheets

DELIVERY ASSEMBLY

BACKGROUND OF THE INVENTION

Bags and suitcases of the professional type, which have excellent mechanical properties such as high resistance to impacts and accidental dropping and/or a hermetic seal in order to prevent the penetration of liquids of various kinds, capable of damaging the contents of the bag, are currently commercially widespread.

These containers are constituted typically by two half-shells made of rigid material in order to ensure the desired impact resistance; at least one of such half-shells has a perimetric slot, which is adapted to accommodate a gasket made of rubber (for example EPDM), which by mating with a suitable abutment surface provided in the other half-shell ensures the hermetic seal.

The production process is entrusted to an assigned operator, who after spreading a layer of adhesive material on the gasket in order to ensure its fixing within the perimetric slot assembles the two half-shells manually.

However, this solution is not free from drawbacks.

First of all, the need to resort to a layer of adhesive material in order to ensure the fixing of the gasket entails an increase in the number of items of the parts list, with the obvious unpleasant consequences in logistic terms and therefore in economic terms.

Further, it should be considered that resorting to materials that are potentially dangerous and harmful for health, such as indeed the adhesives that constitute the adhesive layer, entails a series of safety measures for their storage and treatment.

Finally, the intervention of an operator heavily affects the production cost: in view of the need to offer products at increasingly competitive prices, this leads to a reduction in the marginality of such product.

SUMMARY OF THE INVENTION

The aim of the present invention is to solve the above-mentioned drawbacks, by providing a delivery assembly that allows to contain the production costs associated with the deposition of the gasket, avoiding the resort to adhesive material to fix the coupling.

Within this aim, an object of the invention is to provide a delivery assembly that allows to contain the production costs associated with the deposition of the gasket, without requiring the intervention of an assigned operator to perform the production steps.

Another object of the invention is to provide a delivery assembly that can be adapted easily to various formats and shapes of products to be processed, without requiring long and complex setup operations.

Another object of the invention is to provide a delivery assembly that ensures high reliability in operation.

Another object of the invention is to provide a delivery assembly that can be obtained easily starting from commonly commercially available elements and materials.

Another object of the invention is to provide a delivery assembly that has a low cost and is safe in application.

This aim and these and other, objects, which will become better apparent hereinafter, are achieved by a delivery assembly for depositing a gasket made of polymeric material within a seat having a predefined shape provided within a product, which comprises at least one working head provided with a nozzle for dispensing said polymeric material substantially in the liquid state, characterized in that an increase in volume is associated with said polymeric material at the phase transition from liquid to solid, the expanded gasket, due to the increase in volume, defining by interference a stable coupling with the seat.

BRIEF DESCRIPTION OF THE DRAWINGS

Further characteristics and advantages of the invention will become better apparent from the following detailed description of two preferred but not exclusive embodiments of the delivery assembly according to the invention, illustrated by way of non-limiting example in the accompanying drawings, wherein.

DESCRIPTION OF THE PREFERRED EMBODIMENTS

Figure 1:
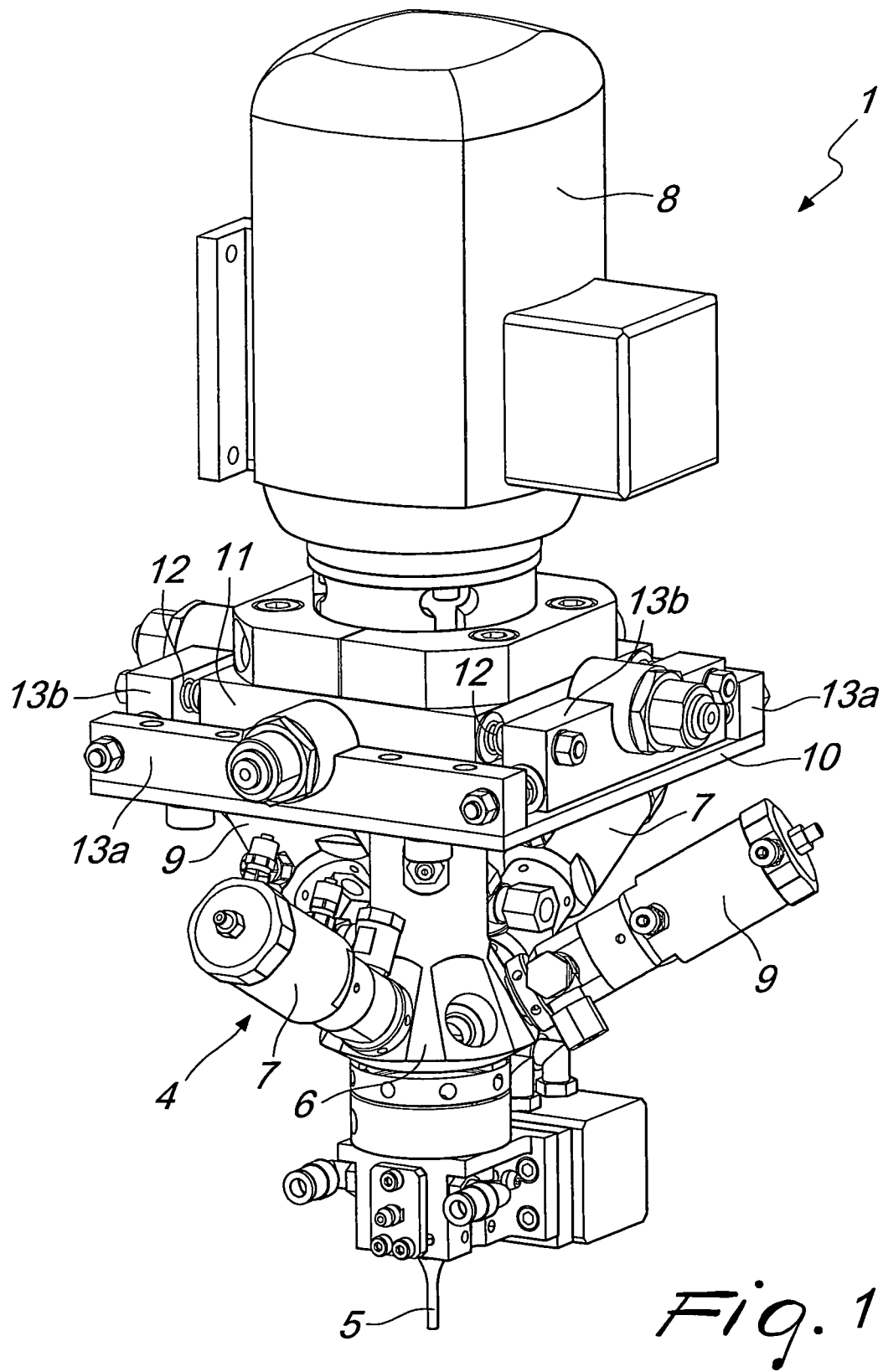
FIG. 1 is a perspective view of the delivery assembly according to the invention, in a first embodiment.
Figure 2:
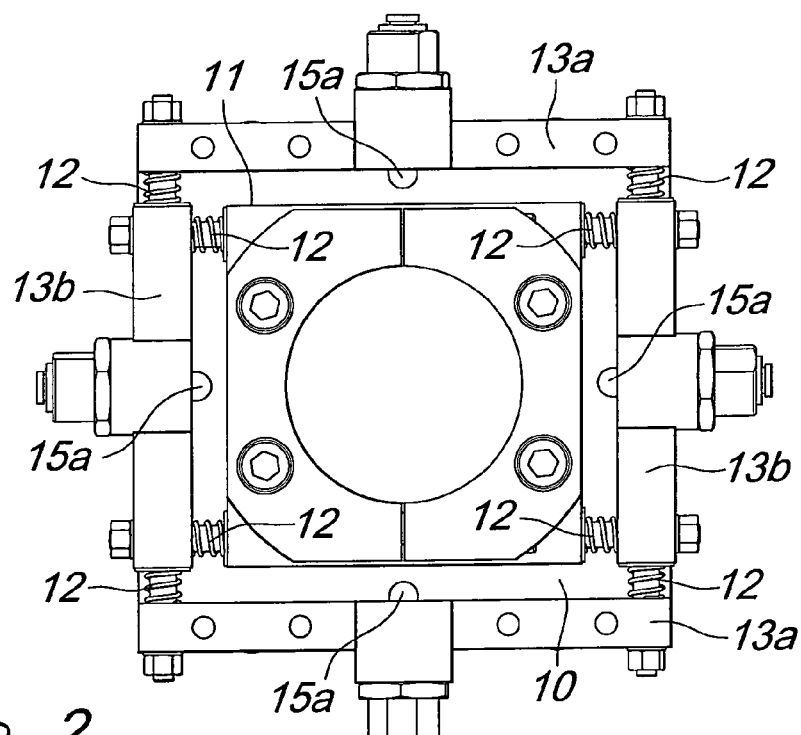
FIG. 2 is a plan view of a component of the delivery assembly of FIG. 1.

With reference to the figures, a delivery assembly according to the invention, generally designated by the reference numeral 1, is capable of depositing a gasket made of polymeric material within a seat 2 that has a predefined shape and is provided within a product 3.

The assembly 1 comprises at least one working head 4, which is provided with a nozzle 5 for dispensing polymeric material substantially in the liquid state.

According to the invention, the polymeric material is selected among those for which an increase in volume occurs upon phase transition from liquid to solid: after depositing such gasket in the liquid state in the seat 2, it is sufficient to wait for such phase transition to obtain a solid expanded gasket, which defines by interference a stable coupling with the seat 2.

The stability of the coupling is thus ensured by the physical properties of the chosen polymeric material and by the resulting interference coupling; resorting to a layer of adhesive material is therefore not necessary, achieving the intended aim.

More particularly, the polymeric material is of the type of polyurethane; applications of the delivery assembly 1 according to the invention, in which a different polymeric material having the particularities described above is used, are however not excluded.

According to a first embodiment, the working head 4 comprises a mixing chamber 6 for the two compounds used to produce the polyurethane, i.e., isocyanate and polyol. These compounds reach the chamber 6 through respective main injectors 7 and are mixed therein by way of the action of a rotating screw moved by a motor 8.

At least one auxiliary injector 9 (two in the embodiment shown in the accompanying figures) further leads to the mixing chamber 6 in order to send solvent and/or air to clean and wash its parts.

Conveniently, the delivery assembly 1 comprises an automatic and reprogrammable apparatus for moving the working head 4, which forms for the nozzle 5 a trajectory that replicates the profile of the seat 2.

Once the information related to the product 3, and in particular to the shape of the seat 2, has been stored in a virtual memory associated with a management unit of the apparatus, such apparatus is capable of moving the working head 4 and the nozzle 5 in order to deposit the gasket along the seat 2.

It is thus possible to automate the gasket dispensing process, in practice no longer requiring the intervention of an assigned operator.

The possibility to reprogram the apparatus further allows to treat different shapes and formats of seats 2 by means of the same delivery assembly 1. Following a change of format it is in fact sufficient to retrieve, by means of the management unit, the new trajectory, stored beforehand in the virtual memory, in order to allow the delivery assembly 1 to treat different products 3 without requiring additional tuning steps.

Conveniently, the delivery assembly 1 according to the invention comprises at least one joint for connecting the movement apparatus to a support of the nozzle 5. Such joint is elastically deformable in order to allow relative movements of the nozzle 5 with respect to such movement apparatus along at least one direction.

The advantages that derive from this embodiment will become better apparent in the continuation of the present description.

In greater detail, according to an embodiment of particular practical interest, which is described by way of non-limiting example of the application of the invention, the support is constituted substantially by a first plate 10, which supports the working head 4 in a lower region.

Figure 4:
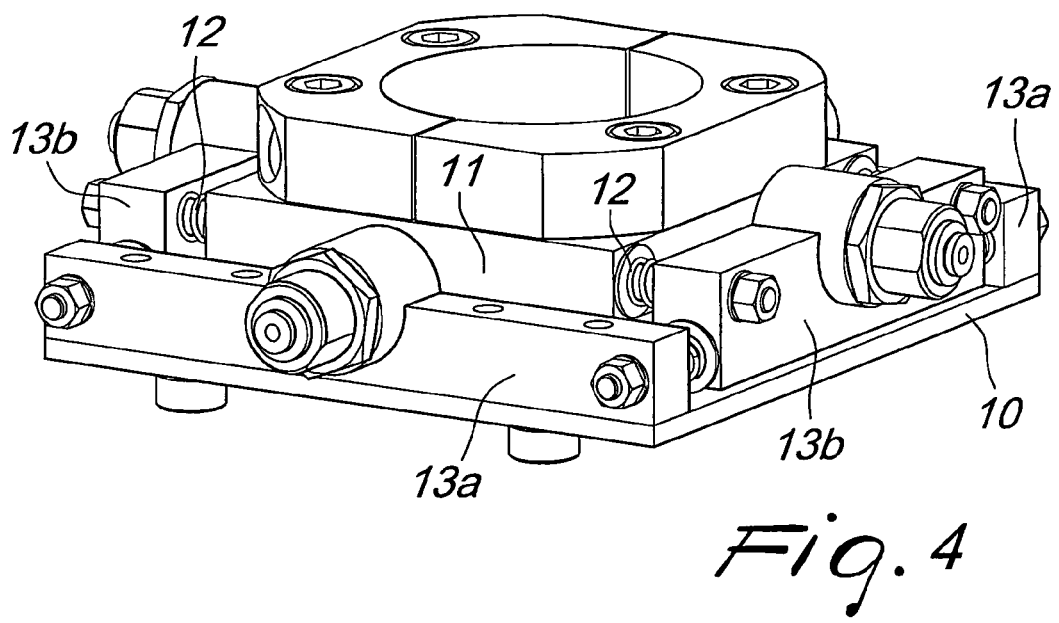
FIG. 4 is a top perspective view of the component of FIG. 2.

As can be seen in particular from FIG. 4, the first plate 10 is connected to a second plate 11, which is jointly connected to the movement apparatus.

This connection between the first plate 10 and the second plate 11 is provided by means of at least two joints, which act elastically respectively along two mutually perpendicular directions.

In particular, according to the embodiment shown in FIGS. 1 to 5, each joint is constituted by a helical spring 12 (in greater detail, the delivery assembly 1 shown in the accompanying figures provides for the use of eight helical springs 12).

More particularly, a pair of first contrast plates 13a is fixed to the first plate 10 and connected by means of two pairs of helical springs 12, which act along parallel directions, to a pair of second contrast plates 13b. Such pair of second contrast plates is in turn elastically coupled to the second plate 11 by way of two other pairs of helical springs 12, which act along directions that are parallel and perpendicular to the preceding ones.

Figure 6:
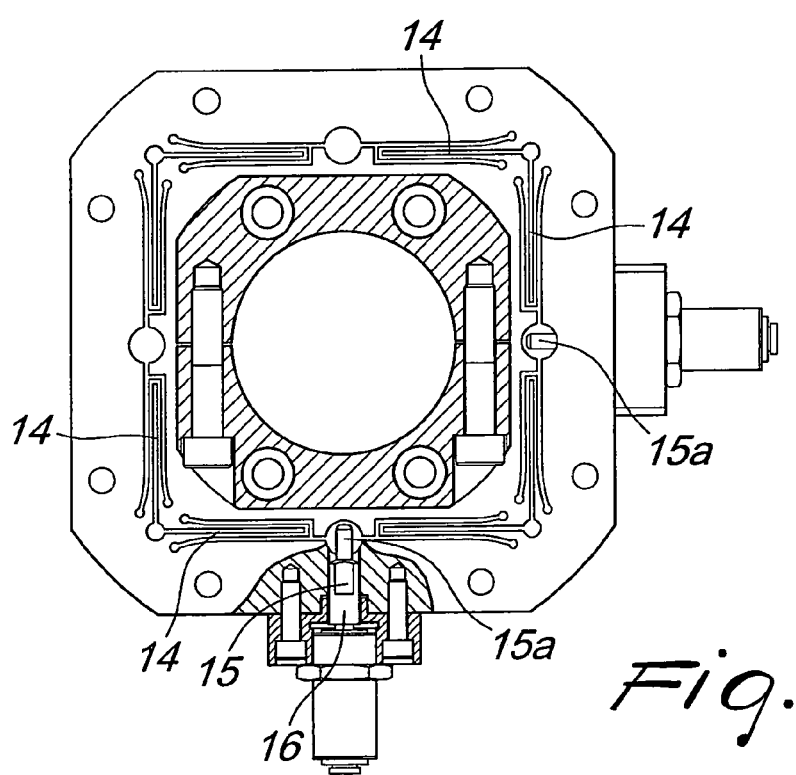
FIG. 6 is a sectional view of the component of the delivery assembly, taken along a plane that is perpendicular to its axis of symmetry, in a second embodiment.
Figure 3:
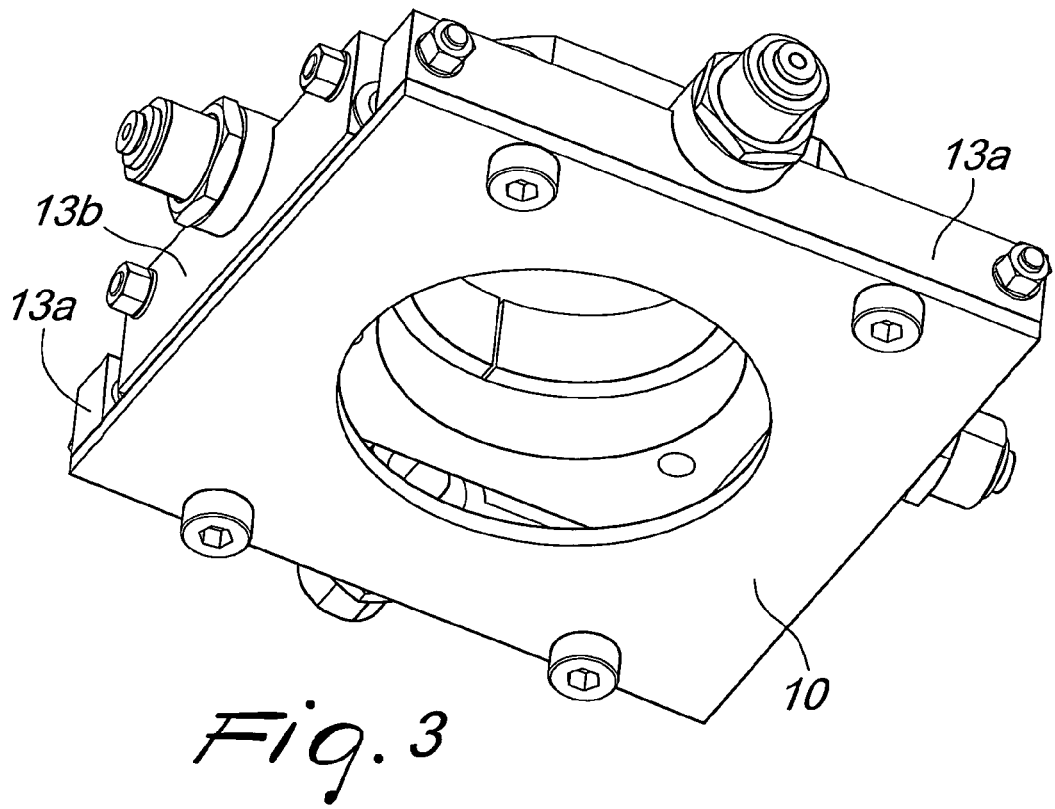
FIG. 3 is a bottom perspective view of the component of FIG. 2.

According to a second embodiment, shown in FIG. 6, each joint is instead constituted by a leaf spring 14.

The elastic deformation of the helical springs 12 or of the leaf springs 14 therefore allows small movements of the nozzle 5 with respect to the movement apparatus.

In this manner, while the movement apparatus forces the working head 4 to perform the preset path, the nozzle 5 can absorb, without being damaged, impacts against any unexpected irregularities of the walls that constitute the seat 2.

The impact in fact merely causes a deformation of the helical spring 12 (or of the leaf spring 14), whose presence therefore allows a deviation of the nozzle 5 from the ideal trajectory.

After passing the irregularity, the elastic return of the joint allows restoration of the nominal conditions and therefore of movement along the preset trajectory.

As noted, the joints act along two mutually perpendicular directions: this allows the nozzle 5 to compensate irregularities of the seat 2 that are distributed in any manner along the entire plane on which the trajectory lies.

The possibility to provide the delivery assembly 1 according to the invention with joints that are elastically deformable also at right angles to the plane of the trajectory is in any case not excluded.

Advantageously, the delivery assembly 1 according to the invention comprises means for adjusting and controlling the maximum value of the relative movements allowed between the nozzle 5 and the apparatus.

Depending therefore on the various applications, it is thus possible to obtain different behaviors of the nozzle 5; for example, it is possible to configure the delivery assembly 1 for operation in an extreme condition in which the nozzle 5 moves jointly with the apparatus, i.e., preventing any small relative movement.

As an alternative, by acting on the adjustment and control means, it is possible to control the maximum extent of the movements of the nozzle 5 with respect to the predefined trajectory.

More particularly, the adjustment and control means comprise at least one threaded piston 15, which can slide along at least one of the above-mentioned directions in a cavity 16 that is functionally associated with the first plate 10.

With reference to FIG. 6, two cavities 16 for two pistons 15 that act along the two perpendicular directions can be provided directly within the first plate 10. As an alternative, as can be seen in particular in FIGS. 2 and 4, the delivery assembly 1 can comprise two pairs of pistons 15, which can slide within the cavities 16 provided in the first contrast plates 13a and in the second contrast plates 13b, each of which acts along one of the two perpendicular directions.

One end 15a of each piston 15 protrudes from the cavity 16 and thus forms an abutment for the second plate 11, at a movement that is equal to the maximum value, thus allowing to stop the relative movement.

In order to adjust and control the positioning of the protruding end 15a, and therefore the maximum allowed value of the stroke of the first plate 10 with respect to the second plate 11, it is sufficient to screw or unscrew the piston 15, making it slide along the cavity 16.

The method for depositing a gasket made of polymeric material in a seat 2 having a predefined shape entails feeding one nozzle 5 of one working head 4 with a polymeric material substantially in the liquid state.

An increase in volume at the phase transition from liquid to solid is associated with the polymeric material, which preferably but not exclusively can be polyurethane.

Such polymeric material is deposited in the substantially liquid state in the seat 2.

Subsequently, the method provides for waiting for the phase transition from liquid to solid of such polymeric material; the increase in volume thus allows to obtain an expanded gasket that forms by interference a stable coupling with the seat 2.

According to a preferred embodiment of the method described above, once the polymeric material has been deposited in the seat 2, the product 3 that bears the seat 2 is stored in storage areas, in which the occurrence of phase transition is expected. This phase transition therefore occurs in the temperature and pressure conditions of the storage area and of the storage facility in which it is located, i.e., typically normal ambient temperature and pressure values.

However, embodiments of the method described above are not excluded which lie within the scope of the protection claimed here and entail the permanence of the product 3 in appropriately provided cells, where it is possible to subject the polymeric material to specific temperature and pressure cycles in order to reduce and/or control the wait for phase transition.

The product 3, according to a preferred but not exclusive embodiment, is a portable container such as a bag or suitcase or the like, and comprises at least two half-shells 17 that can be mutually coupled so as to form an internal containment compartment 18.

These containers must ensure, for some applications of the substantially professional type, a high resistance to atmospheric agents (and to impacts). This leads to the need to accommodate, typically along the perimetric seat 2 provided inside at least one of the two half-shells 17, a sealing gasket made of polymeric material.

The container thus has a gasket that has expanded as a consequence of an increase in volume of the polymeric material that constitutes it, this increase in volume having occurred at the phase transition from liquid to solid. Such gasket is therefore stably coupled to the seat 2, without resorting to the use of adhesives.

With reference to this type of product 3, the advantages that arise from the choice to provide the nozzle 5 with the possibility of relative motion, albeit limited, with respect to its movement apparatus, are more evident.

Figure 5:
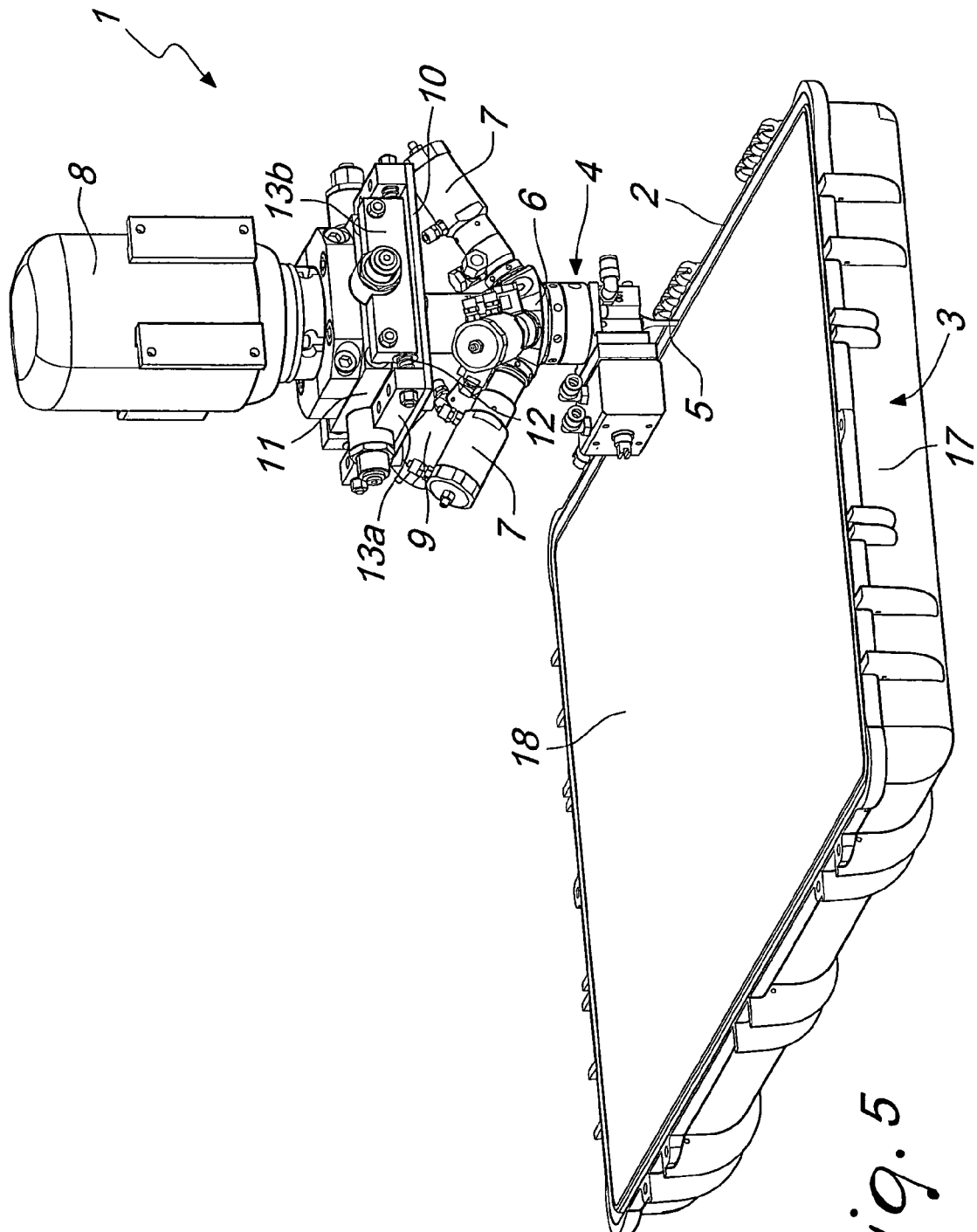
FIG. 5 is a view of the operation of the delivery assembly of FIG. 1.

In order to allow correct deposition of the gasket, the movement apparatus moves the nozzle 5 inside the slot that constitutes the seat 2, as shown in particular in FIG. 5.

Subsequently, such apparatus moves the working head 4 and the nozzle 5 according to the predefined trajectory, which replicates the shape of the seat 2.

However, it should be noted that the half-shells 17 are usually made of plastic material and are obtained by molding: frequently errors in linearity and parallelism occur, particularly due to shrinkage, which cause the shape of the seat 2 to differ even substantially from the nominal shape for which the trajectory of the nozzle 5 has been defined.

The nozzle 5 is therefore destined to strike the walls of the slot: the presence of the elastically deformable joints avoid the danger of damage as a consequence of the impacts. The impact in fact causes the helical springs 12, or the leaf springs 14, to deform without therefore damaging the nozzle 5, which can thus continue to proceed along the preset path.

In practice it has been shown that the delivery assembly according to the invention fully achieves the preset aim, since the gasket, expanded as a consequence of the increase in volume that has occurred at the phase transition from liquid to solid of the appropriately chosen polymeric material that constitutes it, allows to provide a stable coupling between such gasket and its seat, avoiding the resort to adhesive material for fixing and therefore allowing a containment of the associated production costs.

The invention thus conceived is susceptible of numerous modifications and variations, all of which are within the scope of the appended claims; all the details may further be replaced with other technically equivalent elements.

In the exemplary embodiments shown, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

In practice, the materials used, as well as the dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A delivery assembly for depositing a gasket made of polymeric material within a seat having a predefined shape provided within a product, the delivery assembly comprising:
    at least one working head provided with a nozzle for dispensing in the seat of the product polymeric material, that is substantially in the liquid state and is suitable to form the gasket, said nozzle being provided with a support thereof,
    wherein the polymeric material is such that an increase in volume is associated therewith at the phase transition from liquid to solid so as to provide the gasket expanded, due to the increase in volume, defining by interference a stable coupling with the seat;
    an automatic and reprogrammable movement apparatus for said at least one working head, which is adapted to define for said nozzle a trajectory that replicates a profile of the seat; and
    at least two joints that connect said automatic and reprogrammable movement apparatus to said support of said nozzle,
    wherein said support is substantially constituted by a first plate, which supports said at least one working head and said nozzle, and by a second plate jointly connected to said movement apparatus, said first plate being connected to said second plate by means of said at least two joints that are provided so as to act elastically between said first and second plates, respectively along two mutually perpendicular directions, to allow relative movements of said nozzle with respect to said automatic and reprogrammable movement apparatus along said two mutually perpendicular directions.

2. The delivery assembly according to claim 1, wherein said polymeric material is of the type of polyurethane.

3. The delivery assembly according to claim 1, wherein said at least one working head comprises a mixing chamber for isocyanate and polyol, which reach said mixing chamber through respective main injectors.

4. The delivery assembly according to claim 3, further comprising at least one auxiliary injector, which leads solvent and/or air to said mixing chamber, for cleaning and washing its parts.

5. The delivery assembly according to claim 1, wherein each of said at least two joints is constituted by a helical spring.

6. The delivery assembly according to claim 1, wherein each one of said at least two joints is constituted by a leaf spring.

7. The delivery assembly according to claim 1, further comprising means for adjusting and controlling the maximum value of the extent of the relative movements between said nozzle and said automatic and reprogrammable movement apparatus.

8. The delivery assembly according to claim 7, wherein said means for adjusting and controlling the maximum value of an allowed extent of the relative movements between said nozzle and said automatic and reprogrammable movement apparatus comprise at least one threaded piston, which can slide along at least one of said two mutually perpendicular directions in a cavity that is functionally associated with said first plate, one end of said piston protruding from said cavity and forming an abutment for said second plate when a relative movement between said first and second plates, along said at least one of said two mutually perpendicular directions, reaches the maximum value of the allowed extent thereof, screwing and unscrewing of said piston allowing adjustment and control of a position of said protruding end of said piston and therefor the maximum value of the allowed extent of said relative movement between said first and second plates along said at least one of said two mutually perpendicular directions.

9. A delivery assembly for depositing a gasket made of polymeric material within a seat having a predefined shape provided within a product, comprising:

at least one working head provided with a nozzle for dispensing, in the seat of the product, polymeric material that is substantially in a liquid state;

an automatic and reprogrammable movement apparatus for said at least one working head, which is adapted to define for said nozzle a trajectory, along a preset path, that replicates a profile of the seat; and a support for said nozzle that comprises a first plate which supports said at least one working head and said nozzle and a second plate jointly connected to said movement apparatus;

wherein said first plate is connected to said second plate by means of at least two joints that are provided so as to act elastically between said first and second plates along two respective mutually perpendicular directions whereby to allow relative movements of said second plate with respect to said first plate and, consequently, of said nozzle with respect to said automatic and reprogrammable movement apparatus, along said two mutually perpendicular directions such as to enable said nozzle, moving along said preset path, to compensate irregularities of the seat in which the gasket is deposited that are distributed along an entire plane on which said trajectory of the nozzle lies.

* * * * *